Oct. 15, 1935.  P. MUCHA  2,017,159
METHOD OF PROTECTING CLOTHING AGAINST DAMAGE
BY INSECTS AND MEANS THEREFOR
Filed Jan. 31, 1934

INVENTOR.
PINCHUS MUCHA
BY
ATTORNEY.

Patented Oct. 15, 1935

2,017,159

UNITED STATES PATENT OFFICE 2,017,159

METHOD OF PROTECTING CLOTHING AGAINST DAMAGE BY INSECTS AND MEANS THEREFOR

Pinchus Mucha, Irvington, N. J.

Application January 31, 1934, Serial No. 709,243

20 Claims. (Cl. 43—124)

This invention relates to a method of protecting clothing against damage by insects, and to means therefor.

Apparently it should be unnecessary to stress the desirability of some means by which may be prevented the activity of insects, such as the common moth, directed against articles of apparel, and even cloth in its unmanufactured state. To terminate such activity in a manner such that it can never endanger such articles of apparel, cloth, and so forth, is an end sought by many. Quite extensive plans have been laid down, and means designed, for the sole purpose of effectuating the entrapment or destruction of the insect, before it has had any opportunity to do, or been in a position of being capable of doing, any damage.

The plans previously followed generally involved as an aim the steering of the insect away from the garments, fabric or similar materials to be protected. For this purpose, it has been a common rule to utilize various odors, which either attracted the insect to an entrapping device or to a destructive medium, or repelled it from the article or articles to be protected. Such odors might, and in many cases, do, become absorbed by the cloth or fabric itself. This condition, as, for instance, where camphor, naphthalene and similar substances are availed of for these purposes, is not at all desirable, especially where the clothes are to be worn immediately upon their removal from association with the insect medium used to protect the garments against the insects. In the case of the use of media for attracting the insect, the problem arises of inducing the insect to travel to one of two attractive bodies; and the cloth to be protected, which is one of these bodies, in many cases, suffers.

Study directed to the habits of insects has resulted in the discovery that the insect is definitely attracted by certain colors, and not by others. Other research along these lines has further shown that, even though, to the human eye, the colors would not be apparent, as, for instance, where bodies of such colors were displayed substantially in complete darkness, still, to the insect, there was a distinct reaction. It was discovered that, even in darkness, total to the human eye, the insect was definitely attracted to bodies of the colors the same as those to which they were attracted in cases where the bodies were definitely illuminated by an effective light source. From this, it is concluded that, substantially under all circumstances, an insect will be definitely attracted by a body of the proper color and will travel to that colored body in preference to other bodies.

It is an object of the invention to provide means, for association with garments, fabrics and similar articles to be protected against attack of insects, to induce travel of the insect, rather than to such articles, to the particular means presented for attracting the insect. In accordance with the invention, the attracting means is given a double attractive property in that not only does it attract the insect at all times owing to its attractive color, but it is given additional attractive property by having, as its base, cloth or fabric, such as wool, to which the insect normally would be attracted even without the factor of the color of the cloth or fabric. When such an attractive cloth or fabric is disposed with relation to other fabrics, such attractive fabric possesses for the insect so much greater attraction than the plain cloth or fabric to be protected, that the insect has been found to travel instinctively and substantially consistently to these properly colored fabrics, and not at all to the article or articles to be protected. To accomplish the complete termination of activity on the part of the insect, this colored fabric may be impregnated or otherwise be endowed with some destructive medium, such as an insecticide capable of so being applied to or made a part of the fabric.

By constituting the attracting means as a fabric impregnated or endowed in this maner, it is made possible to use such means in relation to fabrics or similar articles to be protected in any one of a number of different ways. In the case of a single isolated garment or piece of cloth, protection is possible by pinning, to the fabric of the garment or to the cloth, one or more pieces of the properly prepared colored fabric. By a proper location of such piece or pieces, substantial areas of the fabric to be protected will be defined as within the range of attraction of such protecting pieces.

In cases such as where fabric in large quantities is stored, as, for instance, in bolts, or rolls, or otherwise as may be the practice, a covering of the fabric prepared in accordance with the invention may be disposed over material so stored.

Casings or bags, for the construction of which fabric in accordance with the invention may be made an element, may also be used so that the fabric of the casing or bag may be active for attracting insects away from fabrics or garments to be protected and which are housed in the casing or bag. In relation to applications of the invention as just set forth, and where fabrics and clothes to be protected are stored substantially in darkness, as, for instance, in closets, the insect has been found to be attracted positively to the prepared fabric rather than to materials to be protected, even though no light rays visible to the normal human eye are reflected from, or emanated by, the prepared fabric.

Other objects of this invention will hereinafter be set forth, or will be apparent from the description, in which is set forth illustrative details of concrete examples for carrying out the invention.

The invention, however, is not intended to be restricted to any particular article of manufacture, or composition of matter, or association thereof, or to any particular application of such article of manufacture, or composition of matter, or association thereof, or to any specific method of operation or manner of use, or to any of the various details thereof, herein described, as the same may be modified in various particulars or be applied in many varied relations without departing from the spirit and scope of the claimed invention, the details herein described merely demonstrating some of the possible concrete applications in which the invention might be used.

On the drawing, in which the same reference characters refer to the same parts throughout, and in which are disclosed such possible concrete applications:

Figure 1:
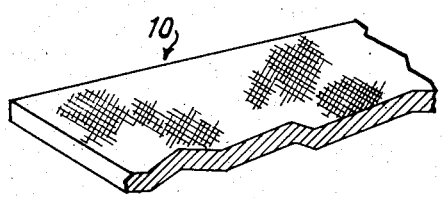
Fig. 1 is a perspective view of a piece of cloth, treated and having properties in accordance with the invention, a part of the cloth being broken away in section to illustrate its construction.

It has been discovered that the basic colors, red and blue, exert a powerful attractive force so that bodies of such color are most effective in attracting insects to them. For the purpose of the invention, fabric of either of these effective colors, or even where both colors appear distinctly, is used. It is to be noted that, for the purposes of this invention, the color effect is to be derived from no luminant, as, for instance, such as any radio-active or phosphorescent substance as a coating for a fabric, but solely from the color introduced into, or an inherent property of, the fabric or similar materials, by reason of dyeing or other methods, whereby the fabric, when viewed under the effect of an ordinary light source, will, to the human eye, and, in this case, to the insect, appear to have a definite color. In this sense, therefore, the fabric or similar material will be capable of emitting light rays as a result of light rays, generated externally of the fabric, and then reflected from the fabric. For the purposes of this description, this status will hereinafter be designated as a non-luminous light emission, and the fabric or similar material as emitting non-luminous light wave vibrations, or as being inherently of a defined color.

Such fabric preferably is of wool. It may be impregnated with an insecticide, or otherwise some insecticide may be introduced into, or applied to, the fabric, either in the form of a solution or in some manner such that the insecticide will remain with the fabric in the subsequent use of the fabric, and especially in the case of liquid insecticides, even after the solvent has evaporated. Such insecticide should not be destructive, either of the material into which it is introduced, or of such materials with which it, or its associated fabric piece, may come into contact.

An insecticide of desirable characteristics was derived from a solution of a non-acid character. Trioxide of arsenic and sodium carbonate were dissolved in water. A very satisfactory solution was derived from dissolving up one part of trioxide of arsenic and three parts of sodium carbonate in water so that the solution contained about 4% arsenic.

The resultant solution was then spread upon the properly colored fabric, or otherwise the solution was introduced into the fabric to leave it effective therein, and preferably so that the surface fibres retained some of the solution. The impregnated fabric could be cut up into pieces of predetermined dimensions or otherwise made up in accordance with the particular manner in which the product was to be used. If desired, the fabric could have been permitted to dry before it was put in proper shape for its final use. The individual pieces might be of such size that they could easily be pinned to fabric or clothes thereby to be protected, or sheets of the fabric of proper dimensions could be disposed as a cover for clothes or fabric to be protected. The fabric also is capable of use in making up bags or casings for other fabrics or clothes to be protected, as, for instance, in the form of the customary clothes bag now commonly used for housing garments in protecting them from insects, or as a lining for such bags.

As the insecticide is left effective at the surface of the fabric, an attack on the fabric by the insect will result in the death of the insect, while the fabric to be protected will, at no time, be in danger. The insecticide, being of a non-acid character, will not harm, in any way, clothes or fabrics to which the pieces may be pinned, or upon which the fabric may otherwise be disposed. Since the insecticide has no odor, the use of the protecting pieces will cause no interference with continued use of garments whenever so desired. In such event, the protecting pieces are quickly unpinned, or the covering removed, and the garment is immediately available for use.

As illustrated on the drawing, the invention is capable of application by use of material such as cloth 10, which may be, in whole or in part, woven or otherwise prepared from insect-attractive substances such as wool. The cloth need have no special method of preparation, except that it will include thread colored in a manner in itself to be attractive to insects, in addition to the fact that it is of such insect-attractive fibre. Such colors may be red, blue, or similar colors, as hereinbefore discussed.

Such fabric may be treated, in the manner described, with an insecticide of a non-acid character, and then is ready for any one of the several purposes to which it may be applied. In cross-section, except possibly under the microscope, such cloth would have the normal appearance of any other similarly manufactured cloth. Under the microscope, of course, it would disclose the insecticide with which it is impregnated.

Figure 2:
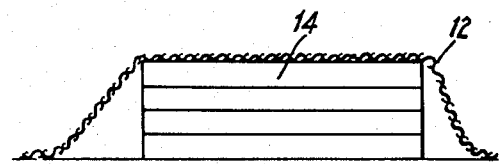
Fig. 2 is a vertical transverse cross-sectional view, through an arrangement of stored cloth protected in accordance with the invention.

As shown in Fig. 2, the cloth may be in one length 12, which then may be disposed as a covering over garments or bolts of cloth 14, stacked or otherwise arranged in any customary manner. In such case, the insect would be attracted to length 12, rather than to the garments or the bolts of cloth, and, of course, would thus be exterminated on attempting to feed upon the treated cloth of length 12.

Figure 3:
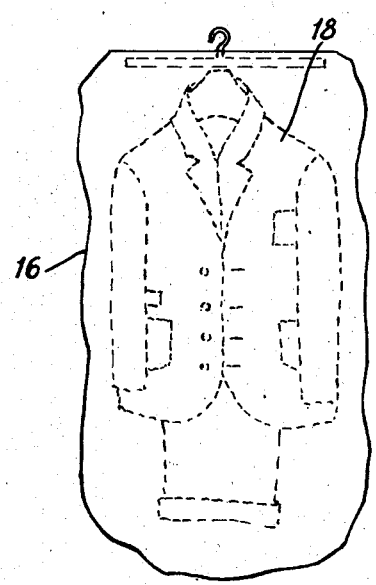
Fig. 3 illustrates a manner of housing clothing, or similar articles, in a bag prepared in accordance with the invention.

In the same fashion, the cloth might be formed into a bag 16, as shown in Fig. 3, within which garments 18 would be inclosed, with the same results substantially as those discussed in connection with Fig. 2.

Figure 4:
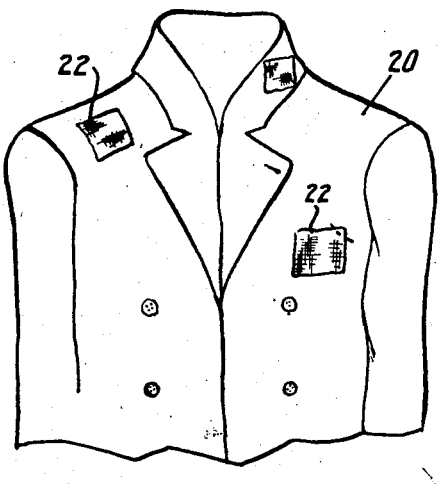
Fig. 4 illustrates an application of the invention to individual articles of clothing.

For an individual garment 20, as shown in Fig. 4, and in such case, whether such garment be exposed to the light or even be housed within a closet, the invention has application, by pinning small sections 22 of cloth 10 at points on the surface of the garment. Then, when the garment is hung in a closet, these points, indicated by sections 22, are foci for the insects, which, even in the dark, are affected by the color of the cloth, and, of course, are attracted to the cloth because of its natural composition. Thus, without any danger of injury to the garment from the insecticide, the garment is given full protection.

Many other changes could be effected in the particular article of manufacture, composition of matter, or association thereof, and in the methods of operation set forth, and in specific details thereof, herein described, without any substantial departure from the invention intended to be defined in the claims, the specific description herein being only to demonstrate, by example, some of the possible practical applications involved in the spirit of the invention.

What is claimed as new and useful is:—

1. As an insect trapping device, an insect-attractive fabric being inherently of an insect-attractive color, the member including an insect-destructive means.

2. As an insect trapping device, a member being inherently of an insect-attractive color, the member including an insect-destructive composition.

3. As an insect trapping device, a member being inherently of an insect-attractive color, the member including a coating of an insect-destructive composition.

4. As means for protecting fabrics from destructive insects, a piece of insect-attractive fabric to be associated with the fabrics to be protected, the fabric piece being capable of emitting non-luminous insect-attracting light wave vibrations, the fabric of the piece including an insect-destructive means.

5. As means for protecting fabrics from destructive insects, a piece of insect-attractive fabric to be attached to fabrics to be protected, the piece being capable of emitting non-luminous insect-attracting light wave vibrations, the piece being impregnated with an insect-destructive means.

6. As means for protecting fabrics from destructive insects, a piece of insect-attractive fabric to be attached to fabrics to be protected, the piece being capable of emitting non-luminous insect-attracting light wave vibrations, the piece being impregnated with a non-acid insect-destructive means.

7. As means for protecting fabrics from destructive insects, a piece of insect-attractive fabric to be attached to fabrics to be protected, the piece being capable of emitting red light wave vibrations, the piece being impregnated with an insect-destructive means.

8. As means for protecting fabrics from destructive insects, a piece of insect-attractive fabric to be attached to fabrics to be protected, the piece being inherently blue in color, the piece being impregnated with an insect-destructive means.

9. As means for protecting fabrics from destructive insects, a piece of insect-attractive fabric to be attached to fabrics to be protected, the piece being capable of emitting non-luminous insect-attracting light wave vibrations, the piece being impregnated with a non-acid solution comprising trioxide of arsenic.

10. As means for protecting fabrics from destructive insects, a piece of a fabric to be attached to fabrics to be protected, the piece being inherently of an insect-attracting color, the piece being impregnated with a solution of trioxide comprising arsenic and sodium carbonate.

11. As means for protecting fabrics from destructive insects, a piece of a fabric to be attached to fabrics to be protected, the piece being inherently of an insect-attracting color, the piece being impregnated with a solution of one part of trioxide of arsenic and three parts of sodium carbonate.

12. As means for protecting fabrics from destructive insects, a piece of a fabric to be attached to fabrics to be protected, the piece being inherently of an insect-attracting color, the piece being impregnated with a solution containing one part of trioxide of arsenic to three parts of sodium carbonate, the arsenic content of the solution being about 4%.

13. As means for protecting fabrics from destructive insects, a piece of insect-attractive fabric to be attached to fabrics to be protected, the piece being inherently red in color, the piece being impregnated with a solution containing one part of trioxide of arsenic to three parts of sodium carbonate, the arsenic content of the solution being about 4%.

14. As means for protecting fabrics from destructive insects, a piece of insect-attractive fabric to be attached to fabrics to be protected, the piece being inherently of blue color, the piece being impregnated with a solution containing one part of trioxide of arsenic to three parts of sodium carbonate, the arsenic content of the solution being about 4%.

15. As means for protecting fabrics from destructive insects, a casing for the fabrics to be protected, the casing including a fabric capable of emitting non-luminous insect-attracting light wave vibrations, said casing fabric being impregnated with a solution of trioxide of arsenic and sodium carbonate.

16. As means for protecting fabrics from destructive insects, a covering for the fabrics to be protected, the covering including a fabric capable of emitting non-luminous insect-attracting light wave vibrations, said covering fabric being impregnated with a solution of trioxide of arsenic and sodium carbonate.

17. As means for protecting fabrics from destructive insects, a casing for the fabric to be protected, the casing including an insect-attractive fabric capable of transmitting or reflecting red light wave vibrations, said casing fabric being impregnated with a solution of trioxide of arsenic and sodium carbonate.

18. As means for protecting fabrics from destructive insects, a casing for the fabrics to be protected, the casing including an insect-attractive fabric capable of transmitting or reflecting blue light wave vibrations, said casing fabric being impregnated with a solution of trioxide of arsenic and sodium carbonate.

19. As means for protecting fabrics from destructive insects, a covering for the fabrics to be protected, the covering including an insect-attractive fabric capable of transmitting or reflecting red light wave vibrations, said covering fabric being impregnated with a solution of trioxide of arsenic and sodium carbonate.

20. As means for protecting fabrics from destructive insects, a covering for the fabrics to be protected, the covering including an insect-attractive fabric capable of transmitting or reflecting blue light wave vibrations, said covering fabric being impregnated with a solution of trioxide of arsenic and sodium carbonate.

PINCHUS MUCHA.

CERTIFICATE OF CORRECTION.

Patent No. 2,017,159.  October 15, 1935.

PINCHUS MUCHA.

It is hereby certified that error appears in the printed specification of the above numbered patent requiring correction as follows: Page 3, second column, line 14, claim 10, for "of" read comprising; and line 14-15, for "comprising" read of; and that the said Letters Patent should be read with this correction therein that the same may conform to the record of the case in the Patent Office.

Signed and sealed this 10th day of December, A. D. 1935.

(Seal)
Leslie Frazer
Acting Commissioner of Patents.